(12) United States Patent
Gielniak

(10) Patent No.: US 9,572,354 B2
(45) Date of Patent: Feb. 21, 2017

(54) DIRECT CURRENT MEAT CARCASS ELECTRICAL STIMULATION ASSEMBLY

(71) Applicant: Bluevent air systems sp. z o.o., Gdynia (PL)

(72) Inventor: Igor Jakub Gielniak, Gdynia (PL)

(73) Assignee: Bluevent Air Systems SP. Z.O.O., Gdynia (PL)

( * ) Notice: Subject to any disclaimer, the term of this patent is extended or adjusted under 35 U.S.C. 154(b) by 0 days.

(21) Appl. No.: 14/410,061

(22) PCT Filed: Jun. 3, 2014

(86) PCT No.: PCT/PL2014/000059
§ 371 (c)(1),
(2) Date: Dec. 20, 2014

(87) PCT Pub. No.: WO2014/196882
PCT Pub. Date: Dec. 11, 2014

(65) Prior Publication Data
US 2016/0165903 A1 Jun. 16, 2016

(30) Foreign Application Priority Data
Jun. 3, 2013 (PL) .......................................... 404190

(51) Int. Cl.
*A22C 9/00* (2006.01)
*A22B 5/00* (2006.01)
(52) U.S. Cl.
CPC .............. *A22B 5/0088* (2013.01); *A22C 9/002* (2013.01)

(58) Field of Classification Search
CPC .............. A22C 9/00; A22C 9/02; A22C 9/008
USPC ................................ 452/57–60, 65, 141–144
See application file for complete search history.

(56) References Cited

U.S. PATENT DOCUMENTS

| | | | | | |
|---|---|---|---|---|---|
| 4,953,263 | A | * | 9/1990 | Lambooy ................. | A22B 3/06 452/58 |
| 5,401,209 | A | * | 3/1995 | Ripol ........................ | A22B 3/06 452/58 |
| 6,290,592 | B1 | * | 9/2001 | Allen ........................ | A22B 3/06 452/141 |
| 6,471,576 | B1 | * | 10/2002 | Ross ........................ | A22B 3/06 452/58 |
| 7,025,669 | B2 | * | 4/2006 | Richards .............. | A22B 5/0088 452/141 |
| 7,241,212 | B2 | * | 7/2007 | Horst ..................... | A22B 3/086 452/58 |

(Continued)

*Primary Examiner* — Richard Price, Jr.
(74) *Attorney, Agent, or Firm* — Inventa Capital PLC

(57) ABSTRACT

An assembly according to the invention includes two pairs of relays, such as SSR semiconductor relays. The relays of each pair operate with the opposite direct current potentials. Direct current with the voltage of 220 V to 400 V as well as control lines are connected to the clamps of the controlled relays. The operation of the relays is controlled by means of a controller, such as a PLC programmable controller. The relays are connected to the first electrode clamp, and the other relays to the second electrode clamp. The assembly operates in such a way that the PLC controller activates the relays from the line, which simultaneously activate the flow of the direct current with the voltage of 220 V to 400 V and mutually opposite polarity. As a result of this, a difference of potentials appears on the electrode clamps.

5 Claims, 1 Drawing Sheet

(56) References Cited

U.S. PATENT DOCUMENTS

| | | | | |
|---|---|---|---|---|
| 7,249,998 | B2* | 7/2007 | van Esbroeck | A22B 5/0088 |
| | | | | 452/58 |
| 7,588,486 | B2* | 9/2009 | Horst | A22C 21/02 |
| | | | | 452/58 |
| 7,686,679 | B2* | 3/2010 | Higuchi | A22B 5/0088 |
| | | | | 452/141 |
| 7,758,406 | B2* | 7/2010 | Piccoli | A22B 3/06 |
| | | | | 452/59 |
| 7,841,928 | B2* | 11/2010 | Tseng | A22B 3/06 |
| | | | | 452/58 |
| 7,892,076 | B2* | 2/2011 | Mirtsching | A22C 9/002 |
| | | | | 452/141 |
| 8,070,565 | B2* | 12/2011 | Horst | A22C 21/0061 |
| | | | | 452/86 |

* cited by examiner

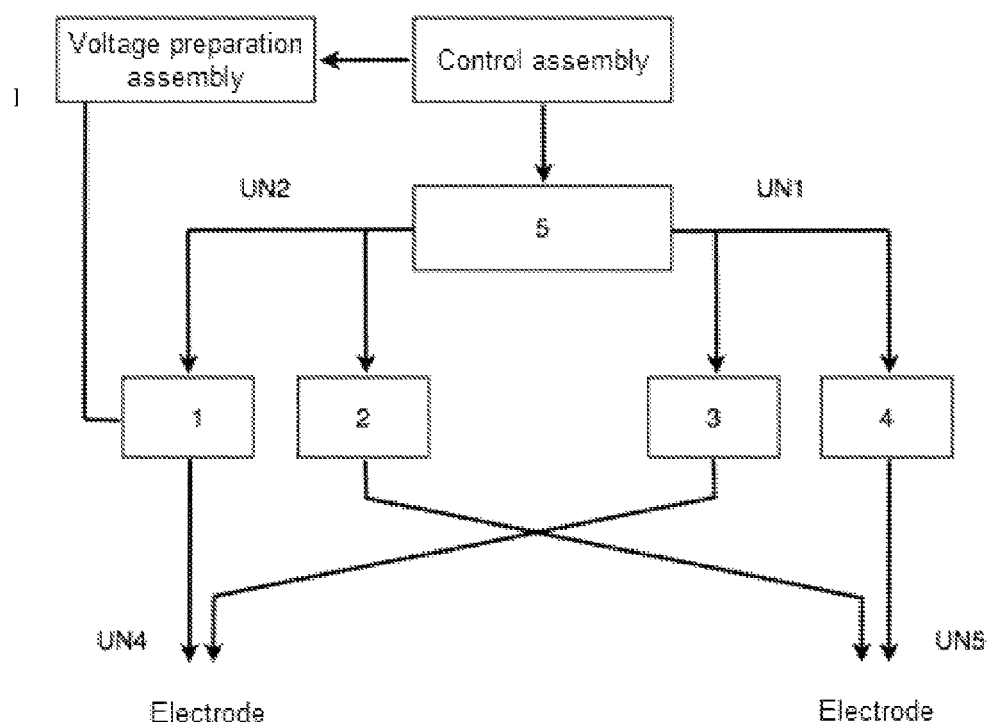

DIRECT CURRENT MEAT CARCASS ELECTRICAL STIMULATION ASSEMBLY

The object of the invention is an assembly for the electrical stimulation of meat carcasses directly after slaughter by means of direct current. The electrical stimulation is usually the final technological operation in the slaughter cycle before cutting the carcass.

Treating the carcasses with alternating current directly after slaughter is known in meat processing technology. This allows for increasing the shelf life of meat, improving its consumptive qualities and reducing the duration of the technological process from slaughter to the freezing of meat. The method of conserving meat carcasses directly after slaughter by means of electric current stimulation is known from the U.S. Pat. No. 2,544,681.

The construction of a beef carcass electrical stimulation device as well as an alternating current electrical stimulation method has been disclosed in the U.S. Pat. No. 2,544,724.

A method of creating and storing meat after slaughter, which involves electrical stimulation of meat with current, the voltage ranging from 12 V to 650 V, the current being no higher than 1.2 A and the frequency ranging from 12.5 Hz to 60 Hz has been presented in the Polish patent PL159605. The meat is subjected to stimulation for the duration of 60 s to 120 s, after which meat portioning is performed. The electrical stimulation device is installed on a horizontal conveyor track. A beef half carcass electrical stimulation assembly, comprising a low frequency generator as well as a set of voltage amplifiers has been disclosed in the Polish patent PL170066. A beef carcass electrical stimulation assembly, whose executive assembly consists of high voltage amplifiers of high power connected to a controlling assembly as well as a controlling and powering transformer, has been disclosed in the patent PL173079.

A processing method for foodstuffs of a cellular structure, such as meat, meat by-products, fish and sea food, involving electroporation in order to increase the efficiency and/or to shorten the stages of the process, as well as in order to achieve the specified degree of foodstuff tenderness, has been presented in the European patent EP 1916901. The method involves applying electric field whose value is >0.5 kV/cm and introducing energy into the cellularly structured foodstuff being processed. The method causes accelerated and evenly distributed receiving of liquid media by the porous mantle created from the cells of meat, meat by-products, sea food and fish, along with dissolved substances. The electroporation can be performed in liquid bath provided with electrodes.

SUMMARY OF THE INVENTION

An assembly according to the invention includes two pairs of relays, such as SSR semiconductor relays. The relays of each pair operate with the opposite direct current potentials. Direct current with the voltage of 220 V to 400 V as well as control lines are connected to the clamps of the controlled relays. The operation of the relays is controlled by means of a controller, such as a PLC programmable controller. The relays are connected to the first electrode clamp, and the other relays to the second electrode clamp. The assembly operates in such a way that the PLC controller activates the relays from the line, which simultaneously activate the flow of the direct current with the voltage of 220 V to 400 V and mutually opposite polarity. As a result of this, a difference of potentials appears on the electrode clamps.

DETAILED DESCRIPTION OF THE PREFERRED EMBODIMENT

The assembly according to the invention consists of two pairs of relays 1 and 2 as well as 3 and 4, preferably SSR semiconductor relays. The relays of each pair operate with opposite direct current potentials. Direct current with a voltage of 220 V to 400 V as well as UN1 and UN2 control lines are connected to the clamps of the controlled relays. The operation of the relays is controlled by means of the controller 5, preferably a PLC programmable controller. The relays 1 and 3 are connected to the first UN4 electrode clamp, and the relays 2 and 4 to the second UN5 electrode clamp.

The assembly operates in such a way that the PLC controller activates relays 1 and 2 from UN2 line, which at the same time activate the flow of direct current with the voltage of 220 V to 400 V and mutually opposite polarity. As a result, a potential difference appears on the UN4 and UN5 electrode clamps. After a specified time period the controller 5 deactivates the relays 1 and 2, and subsequently activates the relays 3 and 4 from the UN1 line, which at the same moment activate the flow of direct current with the voltage of 220 V to 400 V and mutually opposite polarity, in such a way that the UN4 and UN5 electrode clamps receive the opposite potential to the potential achieved from relays 1 and 2. The cycle of current flow activation by relays 1 and 2, current flow deactivation and activation by relays 3 and 4 as well as subsequent deactivation occurs with a frequency of 1 to 50 Hz.

The assembly allows for achieving the current of optimal parameters essential for the meat carcass electrical stimulation, while it is possible to regulate the parameters within a wide range and adjust them to the meat being stimulated. The use of relays allows for applying direct or rectified current of any voltage essential for conducting the electrical stimulation process to the controlled clamps, while controlling the operation of the relays by the controller allows shifting the potentials of the electrode clamps with a frequency changeable within a wide range. The use of the programmable controller allows for remote monitoring of its operation and affecting the electrical stimulation parameters, e.g. via a computer network.

The object of the invention has been presented in the embodiments in the drawing in FIG. 1.

The assembly consists of two pairs of SSR semiconductor relays 1 and 2 as well as 3 and 4. The relays of each pair operate with opposite direct current potentials. Direct current with a voltage of 220 V to 400 V as well as UN1 and UN2 control lines are connected to the clamps of the controlled relays. The operation of the relays is controlled by means of the PLC programmable controller 5. The relays 1 and 3 are connected to the first UN4 electrode clamp and the relays 2 and 4 to the second UN5 electrode clamp. Activation of the relay 1 and 2 occurs from the UN2 line, as a result of which positive voltage appears on UN4 and negative voltage on UN5. The controller 5 deactivates the UN2 circuit, as a result of which the absence of voltage occurs on UN4 and UN5. After a specified time period the controller 5 causes the activation of relay 3 and 4 from the UN1 line, as a result of which positive voltage appears on UN5 and negative voltage on UN4. The controller 5 deactivates the UN1 circuit, as a result of which the absence of voltage occurs on UN4 and UN5. In one cycle, one polarisation of the electrodes is maintained for 45% of the time. The hiatus in the electrode polarisation—the absence of potential difference—lasts for a total of 10% of the time, 5% between each of the polarisation shifts. The cycle repeats with the frequency programmed in the controller 5—1 to 50 times during 1 s. The total duration of the stimulation is limited and programmed in the controller 5 for 1 to 600 s.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A direct current meat carcass electrical stimulation assembly for animal carcasses after slaughter of the animals and electrostimulation of skinned meat carcass, the direct current meat carcass electrical stimulation assembly comprising:
    two pairs of relays (1, 2, 3, and 4), the relays of each pair operating at the same time with the opposite direct current potentials,
    a relay controller (5) having control lines (UN1) and (UN2) connected to clamps of the control relays, and the direct current transferred to electrode clamps (UN4 and UN5) being connected to the clamps of the controlled relays, in such a way that the relays (1 and 3) are connected to the electrode clamp (UN4) and the relays (2 and 4) to the electrode clamp (UN5), wherein the frequency of the cyclic shifts of relay operation ranges from 1 to 50 Hz.

2. The assembly according to claim 1, wherein the relays (1, 2, 3 and 4) are SSR semiconductor relays.

3. The assembly according to claim 1, wherein the relay controller (5) is a PLC programmable controller.

4. The assembly according to claim 1, wherein the voltage of the controlled direct current ranges from 220 V to 400 V.

5. A direct current meat carcass electrical stimulation assembly for animal carcasses after slaughter of the animals and electrostimulation of skinned meat carcass, the direct current meat carcass electrical stimulation assembly comprising:
    two pairs of relays (1, 2, 3, and 4), the relays of each pair operating at the same time with the opposite direct current potentials, wherein the relays (1, 2, 3 and 4) are SSR semiconductor relays;
    a relay controller (5) having control lines (UN1) and (UN2) and connected to clamps of the control relays, and the direct current transferred to electrode clamps (UN4 and UN5) being connected to the clamps of the controlled relays, in such a way that the relays (1 and 3) are connected to the electrode clamp (UN4) and the relays (2 and 4) to the electrode clamp (UN5), wherein the relay controller (5) is a PLC programmable controller and the frequency of the cyclic shifts of relay operation ranges from 1 to 50 Hz and the voltage of the controlled direct current ranges from 220 V to 400 V.

* * * * *